United States Patent [19]

Post et al.

[11] 4,004,314
[45] Jan. 25, 1977

[54] MAGNETIC TAPE CLEANING DEVICE

[75] Inventors: Herman D. Post, Great Neck; Seymour Scher, East Meadow, both of N.Y.

[73] Assignee: Robins Industries Corporation, Commack, N.Y.

[22] Filed: Jan. 7, 1976

[21] Appl. No.: 646,959

[52] U.S. Cl. .............................. 15/97 R; 15/210 R; 15/256.5; 360/128; 360/137

[51] Int. Cl.² ........................................... G11B 5/00

[58] Field of Search ............ 15/97 R, 210 R, 256.5, 15/246; 274/47; 360/128, 137

[56] References Cited

UNITED STATES PATENTS 3,961,375  6/1976  Mika et al. ..................... 360/137

*Primary Examiner*—Edward L. Roberts
*Attorney, Agent, or Firm*—Michael J. Striker

[57] ABSTRACT

A tape cleaning device, particularly for cleaning magnetic tapes contained in cartridges, cassettes or analogous receptacles, includes a housing having a leading end insertable into a tape recording and playing unit which has a capstan drive, and a trailing end adapted to receive a receptacle which accommodates magnetic tape which is to be cleaned. A belt drive which is adapted to be driven by the capstan drive is provided in the housing and is operative for advancing successive portions of the magnetic tape accommodated in the receptacle towards and past a predetermined location on the housing. A portion of cleaning tape is supplied to the predetermined location for physical contact with the advancing magnetic tape for cleaning the latter. Successive portions of the cleaning tape are incrementally advanced towards the predetermined location.

13 Claims, 1 Drawing Figure

U.S. Patent  Jan. 25, 1977  4,004,314
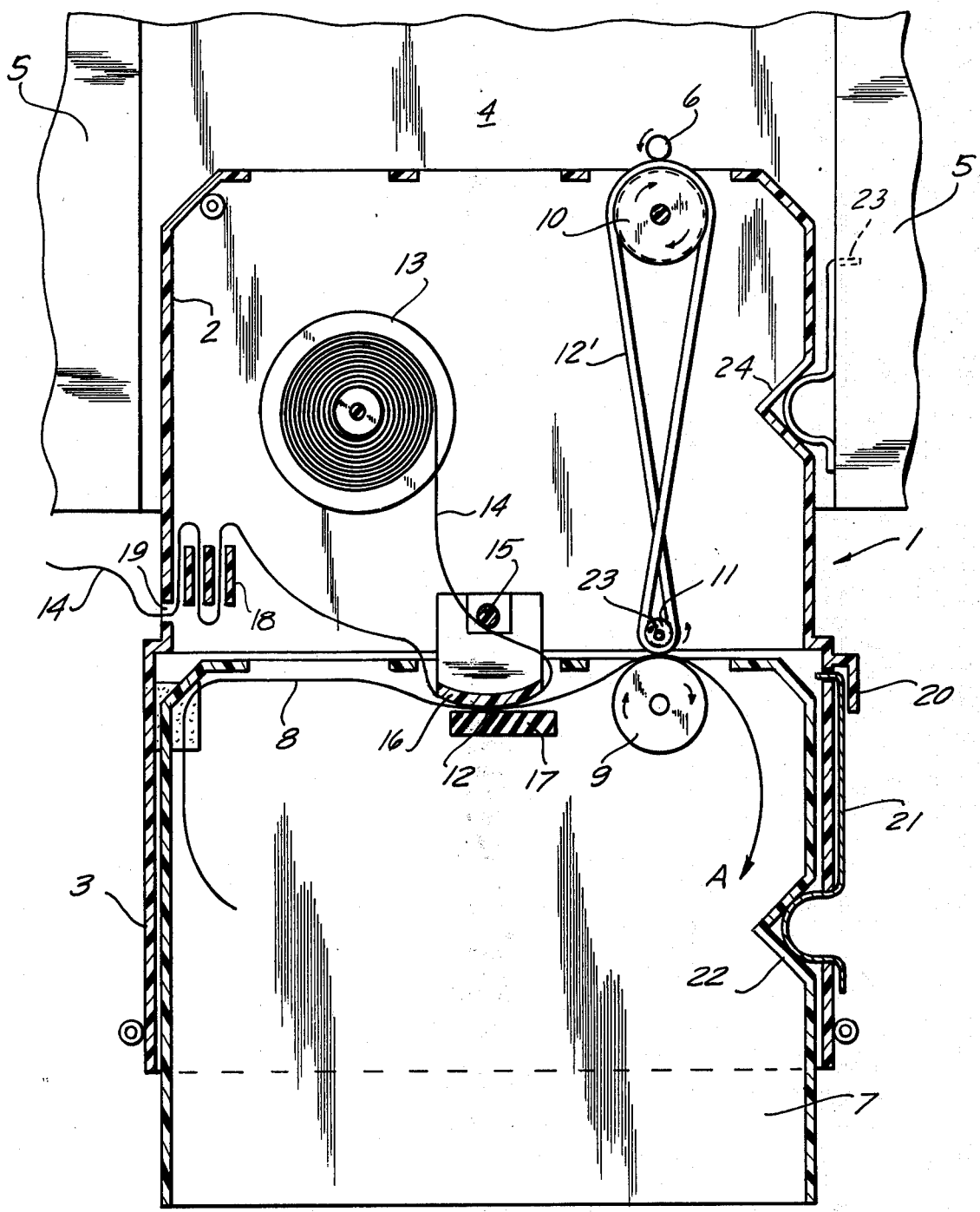

MAGNETIC TAPE CLEANING DEVICE

BACKGROUND OF THE INVENTION

The present invention generally relates to a tape cleaning device and, more particularly, to a device for cleaning magnetic tapes which are accommodated in cartridges, cassettes, or analogous receptacles.

After a period of use, it is necessary to remove dust, grit and oxide accumulations from magnetic tape in order to improve its frequency response. This cleaning is particularly necessary in the case of eight-track cartridges commonly used in especially dirty environments, such as automobiles.

Such magnetic tape cartridges are characterized in that one side of the tape is coated with graphite and the other side of the tape is coated with magnetic oxide. Thus, when the graphite coating and/or the magnetic oxide coating on opposite sides of the tape flake off as they respectively rub against various guiding elements such as the magnetic head, these flakes interfere with the frequency response of the tape.

The prior art has proposed only the cleaning of the magnetic head by using cleaning cloths and/or liquid solvents. No proposal has been directed solely to the direct cleaning of the magnetic tape itself. In any event the prior art techniques have not proven altogether satisfactory in removing the oxide accumulations in a quick, efficient and economical manner.

SUMMARY OF THE INVENTION

Accordingly, it is the general object of the present invention to overcome the disadvantages of the prior art.

An additional object of the present invention is to improve the cleaning of the magnetic tape itself so as to improve its frequency response.

An additional object of the present invention is to rapidly clean the magnetic tape.

Still a further object of the present invention is to efficiently clean the magnetic tape with a non-abrasive type of cleaning tape.

An additional object of the present invention is to polish and smooth the surface of the magnetic tape so as to improve its quality and frequency response.

In keeping with these objects and others whih will become apparent hereinafter, one feature of the invention resides, briefly stated, in a tape cleaning device, particularly for cleaning magnetic tape contained in cartridges, cassettes, or analogous receptacles, which comprises a housing having a leading end which is insertable into a tape recording and playing unit that has a capstan drive and a trailing end that is adapted to receive a receptacle which accommodates magnetic tape that is to be cleaned. Motion-transmitting means which is adapted to be driven by the capstan drive is operative for advancing the magnetic tape in the receptacle so as to convey successive portions thereof towards and past a predetermined location of the housing. In addition, a portion of cleaning tape is supplied to the predetermined location for physical contact with the advancing magnetic tape so that the latter can be cleaned thereby.

These features assure that the magnetic tape is reliably cleaned. The cleaning tape removes the dust, grit and oxide accumulations from the magnetic tape as the latter engages the portion of the cleaning tape which is at the predetermined location on the housing. In addition, the physical contact smoothes and polishes the magnetic tape so that its quality and frequency response are substantially improved.

Another feature of the invention permits successive portions of the cleaning tape to be incrementally advanced towards the predetermined location. Whenever required, a fresh portion of cleaning tape is supplied to the predetermined location. In accordance with the invention, a plurality of closely spaced vanes are provided on the housing, each adjacent pair of which bounds a guiding channel which receives and frictionally retains the cleaning tape therein.

Another feature of the invention is embodied in the motion-transmitting means which preferably comprises a first larger roller and a second smaller roller, each of the rollers being trained about a belt drive. The difference in size between the aforementioned rollers creates a mechanical advantage since the smaller roller turns faster than the larger roller, thereby facilitating the rapid advancement of the magnetic tape when the motiontransmitting means is driven by the capstan drive of the tape recording and playing unit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a top view of the tape cleaning device, with the top cover removed, according to a preferred embodiment of the invention.

DESCRIPTION OF THE PREFERRED EMBODIMENTS

Referring to the single FIGURE, it will be seen that reference numeral 1 generally identifies a housing, with its top cover removed for the sake of clarity, constituted of synthetic plastic material and having an upper, generally rectangularly-shaped, leading end 2 and a lower, generally rectangularly-shaped, trailing end 3. The leading end 2 is adapted to be inserted into a conventional rectangular opening 4 of a tape recording and/or playing unit 5. The leading end 2 of the housing 1 is inserted into opening 4 until it is situated adjacent the capstan drive 6 of the unit 5. The unit 5 has only been partially illustrated for the sake of clarity. Such units are entirely conventional in the art and are believed to require no detailed discussion.

The trailing end 3 is adapted to receive a receptacle 7 which accommodates magnetic tape 8 which is required to be cleaned. Such receptacles 7 are also entirely conventional in the art and have been diagrammatically illustrated only for the sake of clarity. It will be understood that such receptacles may constitute conventional cartridges, such as eight-track cartridges, or cassettes, or analogous-type receptacles.

As is evident from the FIGURE, the trailing end 3 is larger than the leading end 2 since the trailing end 3 must accommodate the receptacle 7 which is ordinarily inserted into the opening 4. The receptacle 7 is inserted until its internally situated pressure roller 9, which is mounted for rotation in the receptacle 7 and which is trained by the tape 8, is situated adjacent roller 11.

Motion-transmitting means are provided in the housing 1 and are adapted to be driven by the capstan drive 6. The motion-transmitting means is operative for advancing the magnetic tape 8 and for conveying successive portions thereof towards and past a predetermined location 12 on the housing 1.

The motion-transmitting means comprises a first larger roller 10 mounted for rotation about a stationary axle on the housing in a first sense, and a second smaller roller 11, also mounted for rotation about a stationary axle on the housing 1 but which is rotatable in a second sense, opposite said first sense, by the presence of a reversing belt 12'. The belt 12' is essentially a flat belt which has been twisted by a one-half turn. Its function is to impart the reverse motion of the roller 10 to the roller 11. Thus, if roller 10 is caused to be turned clockwise, as shown in the FIGURE, then roller 11 will rotate counterclockwise, or vice versa. It is also evident that a mechanical advantage exists because of the difference in size between rollers 10 and 11. The smaller roller 11 is caused to turn faster than the larger roller 10, thus increasing the speed of advancement of the magnetic tape 8.

A supply spool 13 of cleaning tape 14, which is preferably of the non-abrasive or slightly-abrasive type, is similarly mounted on housing 1 on a stationary axle. The leading end of the cleaning tape 14 is guided towards the predetermined location 12 by means within the housing 1 which engages at least one side of the tape 14. For example, a cylindrical post 15 is preferably located intermediate the spool 13 and the predetermined location 12 and is operative for engaging one side of the tape 14. Of course, a pair of posts or vanes or like elements could also be provided to bound a slot for the tape 14 to pass therethrough.

At the predetermined location 12 itself, abutting means are provided for facilitating physical contact between the magnetic tape 8 and the cleaning tape 14. An abutment, preferably an arcuate abutment 16, extends upwardly from the housing 1, and pressure means 17 is located in the receptacle 7 at a slight distance from the abutment 16. The pressure means 17 is operative for lightly urging the magnetic tape 8 which is being advanced past the predetermined location 12 against a portion of cleaning tape 14 which is already supported by the abutment 16. The pressure member 17 is preferably a resiliently yieldable pad of foam rubber or felt material.

Downstream of the predetermined location 12, the leading end of the tape 14 is guided through a plurality of spaced-apart members, such as posts or preferably vanes 18. Each adjacent pair of vanes 18 bounds a guiding channel for the tape 14 so that the latter can be threaded first in an opposite direction through a second channel in a wave-like pattern. The vanes 18 are closely spaced so that the tape 14 can be frictionally retained in the respective channels.

An aperture 19 is provided on the housing 1 adjacent the vanes 18 so that a user may have access to the leading end of the tape 14, as will be explained below.

In operation, a user will insert the leading end of the housing 1 into the opening 4 of a tape recording and/or playing unit 5 until a portion of the reversing belt 12' trained about the larger roller 10 is engaged by the capstan drive 6. In order to ensure secure engagement of the larger roller 10 with the capstan drive 6, the leading end of the housing 1 is provided with a detent 24 which receives the resilient metal clip 23 with a snap-type action. Thereupon, a receptacle 7 is inserted into the trailing end 3 of the housing 1 until a portion of the magnetic tape 8 trained about the pressure roller 9 is engaged by a portion of the reversing belt 12' that is trained about the smaller roller 11. It will also be evident that the receptacle 7 need not be inserted into the housing 1 after the latter has been inserted into the unit 5; it is also possible that the receptacle 7 can be inserted simultaneously with the housing 1. At the same time, the cleaning tape 14 on the spool 13 is guided past the cylindrical post 15, the abutment 16, and inserted through the channels defined by the vanes 18 and out through the aperture 19.

When the capstan drive 6 is actuated, for example in the counterclockwise sense, the small roller 11 will also be turned in the counterclockwise sense, thereby driving pressure roller 10 in the clockwise sense and the magnetic tape 8 in the direction of the arrow A. As noted above, the mechanical advantage established by the difference in size of the rollers 10 and 11 increases the speed of advancement of the advancing magnetic tape 8. The advancing tape 8 will be cleaned at predetermined location 12.

After the portion of cleaning tape 14 located at predetermined location 12 has been used for cleaning purposes, a user will manually pull the leading end of the tape 14 which projects out of the aperture 19 and incrementally advance another fresh portion of the cleaning tape 14 towards the predetermined location 12.

In order to insure proper engagement of the motion-transmitting means and the receptacle 7, the housing 1 is further provided with a retainer bar 20 which accommodates a portion of a resilient clip 21. The clip 21 is preferably of metal material and snaps into and out of a detent 22 provided on the receptacle 7 in a similar manner as discussed above with reference to resilient clip 23 and detent 24.

In accordance with another feature of the invention, a viewing slot is provided on the top cover (not illustrated) which closes the housing 1. The viewing slot generally overlies the smaller roller 11 and, more particularly, a mark, such as marking dot 23, so that a user can readily determine, by merely examining whether the dot 23 is moving past the slot, whether the tape cleaning device is operative or not.

Furthermore, the top cover may be provided with a trap door which is adapted to be opened so that the supply spool can be replaced, whenever necessary, and so that the guidance of the cleaning tape 14 through the housing is facilitated.

It will be understood that the motion-transmitting means is not intended to be limited to the details given above, that is to a pair of rollers 10, 11 and a reversing belt 12'. The motion-transmitting means may also be comprised of a gear drive transmission system, just to mention one possibility.

As for the means for supplying cleaning tape, here again, such means may be comprised of a pair of friction rollers and a knob which extends from one of such rollers outwardly of the housing. Of course, the cleaning tape 14 may also be advanced by a gear transmission system.

It will be further understood that each of the elements described above, or two or more together, may also find a useful application in other types of constructions, differing from the types described above.

While the invention has been illustrated and described as embodied in a magnetic tape cleaning device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A tape cleaning device, particularly for cleaning magnetic tape contained in cartridges, cassettes or analogous receptacles, comprising a housing having a leading end insertable into a tape recording and playing unit having a capstan drive, and a trailing end adapted to receive a receptacle accommodating magnetic tape which is to be cleaned; motion-transmitting means adapted to be driven by said capstan drive and operative for advancing the magnetic tape in said receptacle so as to convey successive portions of the magnetic tape towards and past a predetermined location on said housing; and means for supplying a portion of cleaning tape to said predetermined location for physical contact with said advancing magnetic tape for cleaning the latter.

2. The tape cleaning device as defined in claim 1; and further comprising means for incrementally advancing successive portions of said cleaning tape towards said predetermined location.

3. The tape cleaning device as defined in claim 2, wherein said means for incrementally advancing said cleaning tape comprises a plurality of closely spaced vanes, each adjacent pair of which bounds a guiding channel which receives and frictionally retains said cleaning tape therein.

4. The tape cleaning device as defined in claim 1, wherein said supplying means comprises a supply spool of cleaning tape; and further comprising means for guiding said cleaning tape from said supply spool towards said predetermined location.

5. The tape cleaning device as defined in claim 4, wherein said guiding means comprises a cylindrical post engaging said cleaning tape at a location intermediate said supply spool and said predetermined location.

6. The tape cleaning device as defined in claim 1; and further comprising means for abutting said portion of cleaning tape with said advancing magnetic tape at said predetermined location, said abutting means comprising an arcuately-shaped abutment and pressure means for lightly urging said advancing magnetic tape and said portion of cleaning tape against said abutment.

7. The tape cleaning device as defined in claim 1, wherein said magnetic tape is trained about a pressure roller mounted for rotation in said receptacle, and wherein said motion-transmitting means engages said capstan drive and said pressure roller for advancing said magnetic tape at a predetermined speed.

8. The tape cleaning device as defined in claim 7, wherein said motion-transmitting means comprises a pair of rollers, each trained about a reversing belt.

9. The tape cleaning device as defined in claim 7, wherein said motion-transmitting means further comprises means for increasing the speed of advancement of said magnetic tape to a speed greater than said predetermined speed, said speed-increasing means comprising a first larger roller and a second smaller roller, each of said rollers being trained about a belt and being operative for establishing a mechanical advantage so that said second roller turns faster than said first roller.

10. The tape cleaning device as defined in claim 1; and further comprising locking means on said housing for securing said receptacle therein.

11. The tape cleaning device as defined in claim 1, wherein said leading and trailing ends of said housing have a rectangular configuration, said trailing end having a larger width than said leading end.

12. The tape cleaning device as defined in claim 1; and further comprising means for indicating the advancement of the magnetic tape.

13. The tape cleaning device as defined in claim 1; and further comprising additional locking means on said housing for securing the latter with said unit.

* * * * *